United States Patent [19]

Sugiura et al.

[11] Patent Number: 4,531,971
[45] Date of Patent: Jul. 30, 1985

[54] METHOD OF AND APPARATUS FOR MELTING SCRAP

[75] Inventors: Sabro Sugiura; Senji Fujita, both of Nagoya; Kenji Kanada, Chita; Noboru Demukai, Gifu; Tetuo Okamoto, Chita, all of Japan

[73] Assignee: Daido Tokushuko Kabushiki Kaisha, Nagoya, Japan

[21] Appl. No.: 568,162

[22] Filed: Jan. 4, 1984

[30] Foreign Application Priority Data

Feb. 16, 1983 [JP] Japan ................................. 58-24369

[51] Int. Cl.³ .............................................. C21C 5/52
[52] U.S. Cl. .......................................... 75/13; 75/12; 75/44 S
[58] Field of Search ................................... 75/10–13, 75/44 S

[56] References Cited

U.S. PATENT DOCUMENTS 3,880,648  4/1978  Forrest .................................... 75/13

Primary Examiner—Peter D. Rosenberg
Attorney, Agent, or Firm—Armstrong, Nikaido, Marmelstein & Kubovcik

[57] ABSTRACT

A method of melting iron scrap using an arc furnace with reduced electric power consumption.

In one of a pair of vessels which are arc furnace bodies, melting of the scrap by heat of arc is carried out while a carbonaceous material and oxygen-containing gas are introduced therein to cause oxidation of C to CO to make use of the oxidation heat. Thus formed hot exhaust gas containing CO is introduced to the other vessel of the pair and oxygen-containing gas is added thereto to cause oxidation of CO to $CO_2$ thereby heating the scrap loaded in the vessel. Melting is further continued by changing the roles of the two vessels to each other.

Generation of the CO-containing hot gas can be performed in a separately installed gasification furnace.

8 Claims, 5 Drawing Figures

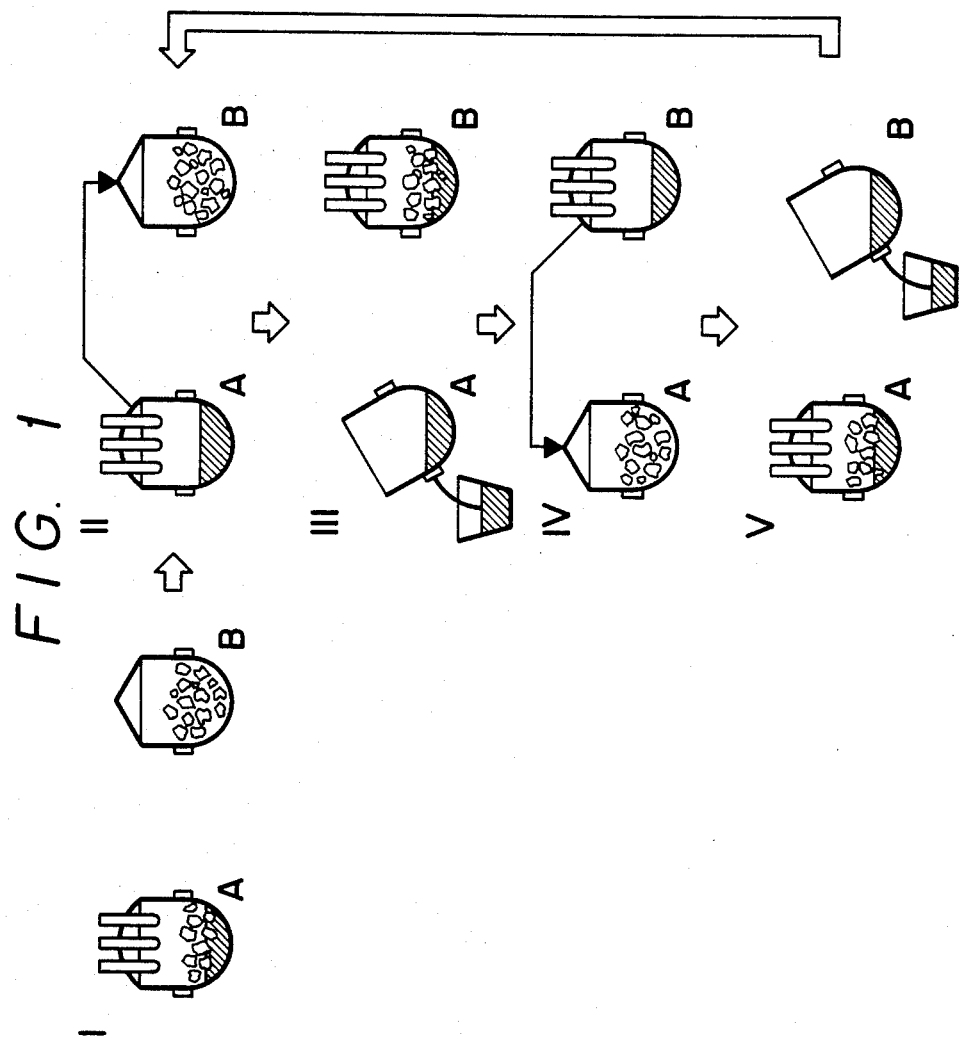

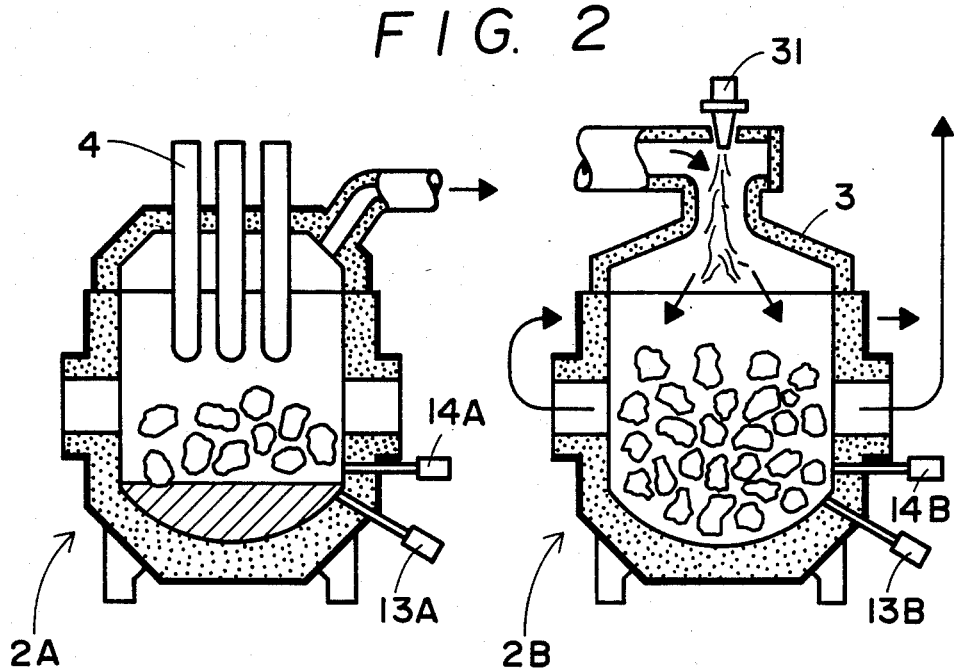
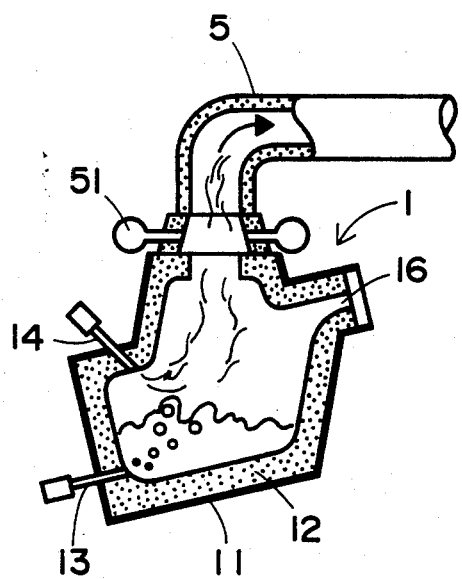
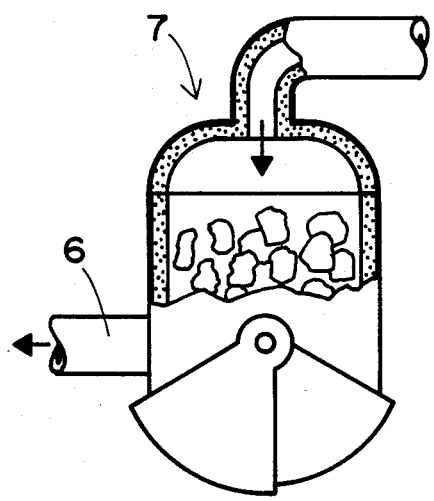

METHOD OF AND APPARATUS FOR MELTING SCRAP

BACKGROUND OF THE INVENTION

1. Field of the Invention

The present invention relates to a method of producing, iron (including pig iron and steel) as a previous step of a steelmaking process, by melting iron scrap with reduced electric power consumption. The invention also concerns an apparatus for carrying out such a melting method.

2. State of the Art

Electric furnaces are generally used in melting scrap for the production of steels, particularly special steels. However, there is only a small possibility of improvement in the electric power situation in the future. Rather, the cost of electric power is expected to continue to rise. The use of petroleum is also disadvantageous because it is now expensive.

Under this circumstance, the present inventors have made an intense study aiming at developing a technology which makes use of carbonaceous material in place of electric power and petroleum. As a result, the inventors have succeeded in establishing a technology referred to as "reactor ironmaking" which has been already disclosed. The inventors have developed also various modifications of this technology.

On the other hand, from the view point of utilizing existing arc furnace equipment as well as the long established steelmaking technology relying upon the arc furnace, it is a practical measure to reduce the electric power consumption in the step of melting scrap in the arc furnace in the steelmaking process, and there has been an increasing demand for such a measure.

SUMMARY OF THE INVENTION

Accordingly, an object of the invention is to provide a melting method which permits a scrap melting in an arc furnace at a high thermal efficiency and, hence, with reduced electric power consumption, thereby to cope with the above-mentioned demand.

Another object of the invention is to provide an apparatus for carrying out the above-mentioned scrap melting method.

BRIEF EXPLANATION OF THE DRAWINGS

FIG. 1 is a schematic illustration of the basic embodiment of a scrap melting method according to the invention, showing the start and the cycle of the method;

FIGS. 2A and 2B are schematic vertical sectional views of an apparatus for use in carrying out the melting method in accordance with the invention;

FIG. 4 is a vertical sectional view of a part of an apparatus for carrying out the method as shown in FIG. 3, other than the parts shown in FIG. 2, illustrating the construction and operation of such part; and FIG. 5 is a vertical sectional view of a scrap pre-heating apparatus suitable for use in a preferred form of the apparatus in accordance with the invention.

DETAILED DESCRIPTION OF THE PREFERRED EMBODIMENTS

Figure 3:
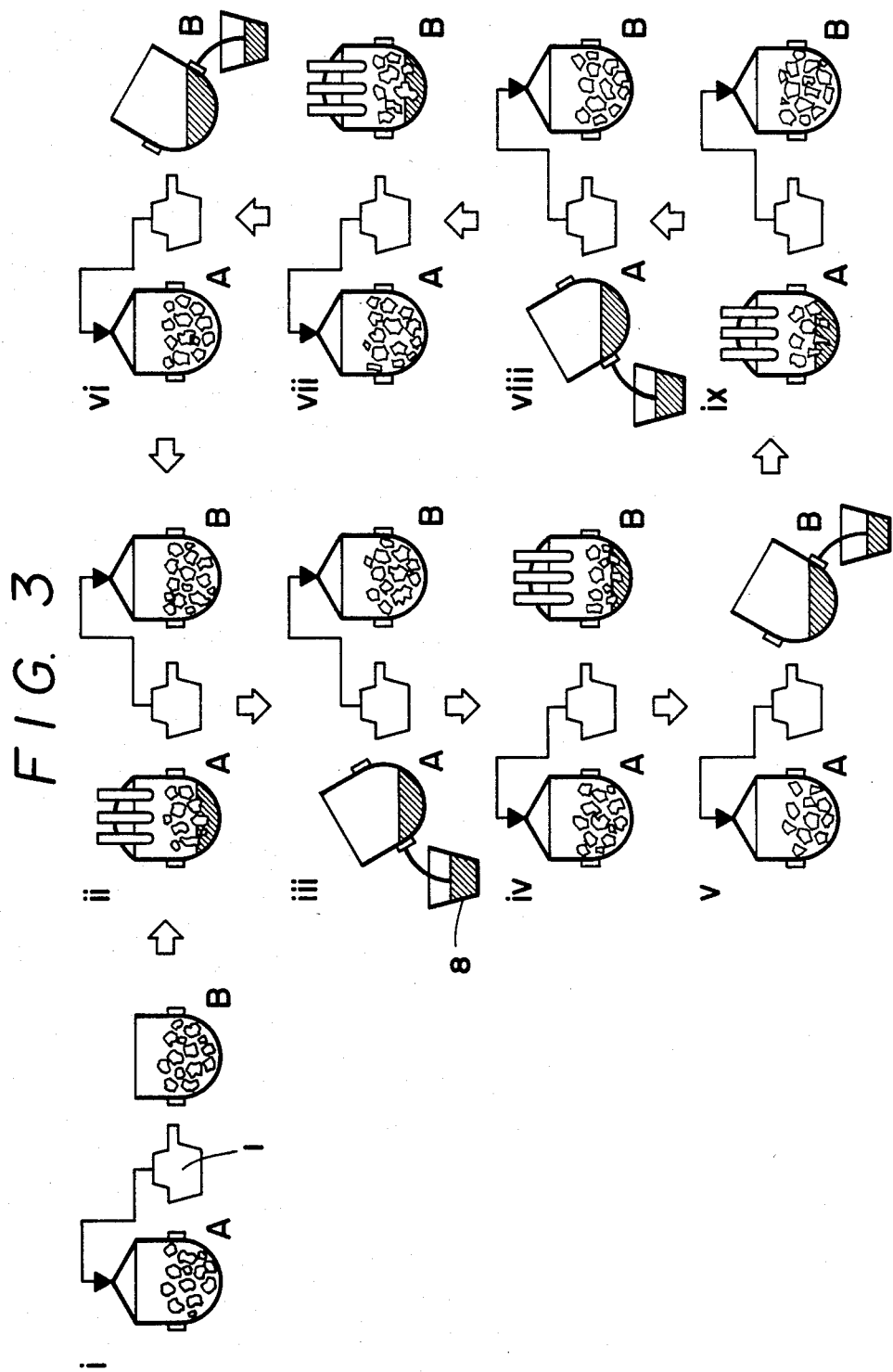
FIG. 3 is a schematic illustration of the start and the cycle of a scrap melting method in accordance with a modified embodiment of the invention.

Referring to the drawings, particularly to FIG. 1, a scrap melting method of this invention basically comprises the following steps:

(I) Loading vessels A and B which are furnace bodies of a pair of arc furnaces with batches of iron scrap and inserting a set of electrodes into the vessel A thereby to commence the melting of the scrap in the vessel A; (FIG. 1I)

(II) Blowing an oxygen-containing gas and injecting a carbonaceous material into the vessel A in which the scrap is being molten thereby to oxidize the carbonaceous material mainly to CO and delivering the hot exhaust gas containing CO to the vessel B while supplying the oxygen-containing gas thereto so as to oxidize the CO into $CO_2$ thereby to heat the scrap in the vessel B by the sensible heat posessed by the hot exhaust gas and the heat produced through the oxidation; (FIG. 1II)

(III) Discharging the molten scrap from the vessel A after completion of the melting while shifting the set of electrodes to the vessel B to commence the melting of the scrap in the vessel B by the heat of the arc; (FIG. 1III)

(IV) Loading the vessel A with a new batch of scrap while blowing the carbonaceous material and an oxygen-containing gas into the vessel B, and delivering the exhaust gas from the vessel B into the vessel A while introducing an oxygen-containing gas thereby to heat the new batch of scrap in the vessel A; (FIG. 1IV)

(V) Discharging the molten scrap from the vessel B after completion of the melting while shifting the set of electrodes to the vessel A to commence the melting of the new batch of scrap in the vessel A; (FIG. 1V); and (VI) Repeating the above steps II to V.

The term "oxygen-containing air" is used here to broadly include pure oxygen, air and a mixture thereof, i.e. air enriched with oxygen.

It is to be noted also that the exhaust gas after the heating of the scrap in the vessel A or B are still considerably hot and, hence, it is desirable to make an efficient use of the heat possessed by the exhaust gas. The exhaust gas generated during the melting by the heat of arc should also be utilized because the temperature of this waste gas is high. From this point of view, a preferred embodiment of the invention uses a separate preheating vessel besides the vessels A and B and the preheating vessel load with the iron scrap. The exhaust gas after heating the scrap in the vessel A or B and the exhaust gas generated during melting by heat of arc are introduced into this preheating vessel so as to preheat the scrap in this vessel. The preheated scrap is charged as an additional charge to the arc melting. Preferably, the ratio of the initial charge to the additional charge for the arc melting is about 60:40 as in the case of ordinary arc melting.

If necessary, it is possible to use an auxiliary burner for heating the scrap in the vessels A and B before or after the use of the exhaust gas so that the scrap temperature is further increased to allow a reduction of the electric power consumption. Fuel oil, fine-powdered coal and combustible gases can be used as the fuel for the auxiliary burner.

FIGS. 2A and 2B schematically shows an apparatus suitable for use in carrying out the method of the invention. As will be seen from these Figures, the apparatus has a pair of vessels 2A and 2B which constitute the bodies of arc furnaces, each vessel having a carbonaceous material injecting nozzle 13 and an oxygen gas blowing nozzle 14, a single lid 3 and a set of arc-generating electrodes 4 (hereinunder referred to as "electrode"). The lid 3 and the electrode 4 are used alternatingly in such a manner that, when the lid 3 is fitted to the vessel 2A, the electrode 4 is received by the vessel 2B or withdrawn therefrom, whereas, when the lid 3 is fitted to the vessel 2B, the electrode 4 is received by the vessel 2A or withdrawn therefrom. The apparatus also has an exhaust gas passage 5 through which the hot exhaust gas from one of the vessels is introduced to the other, a means for introducing the oxygen-containing gas into the exhaust gas containing CO thereby to burn the same into $CO_2$. This means (not shown in the drawings) may be disposed above the vessels or in the exhaust gas passage 5. A reference numeral 31 designates an auxiliary burner attached to the lid 3 integrally therewith. The functions or operations of these constituents will be understood from the foregoing general description of the scrap melting method of the invention.

Briefly, the scrap melting method of the invention is to reduce the electric power consumption by making use of the heat produced as a result of burning of CO which is generated through gasification reaction of a carbonaceous material with oxygen.

According to a modified embodiment of the invention, the reaction between the carbonaceous material and oxygen is made in a specific gasification furnace, separately from the arc furnace in which the scrap is molten, as will be understood from the following description. As will be seen from FIG. 3, the scrap melting method in accordance with the modified embodiment of the invention comprises the following steps:

(i) Loading vessels A and B which are furnace bodies of a pair of arc furnaces with batches of iron scrap, while loading a gasification furnace with molten iron, and blowing oxygen-containing gas and injecting a carbonaceous material into the molten iron thereby to oxidize the carbonaceous material mainly to CO and delivering the hot exhaust gas thus formed to the vessel A as shown by an arrow while blowing the oxygen-containing gas thereto so as to oxidize the CO into $CO_2$ thereby to heat the scrap in the vessel A by the sensible heat posessed by the hot exhaust gas and the heat produced through the oxidation; (FIG. 3i)

(ii) Switching the delivery of the gas from the gasification furnace and the blowing of the oxygen-containing gas from the vessel A to vessel B as shown by an arrow so as to heat the scrap in the vessel B, while inserting a set of electrodes 4 into the vessel A and energizing the same thereby to melt the scrap in the vessel A; (FIG. 3ii)

(iii) After completion of melting of the scrap in the vessel A, discharging the molten iron into, for example, a ladle 8 while continueing heating of the scrap in the vessel B; (FIG. 3iii)

(iv) Loading the vessel A again with scrap and switching again the delivery of the gas from the gasification furnace and the blowing of oxygen-containing gas from the vessel B to the vessel A, while inserting a set of electrodes 4 into the vessel B and energizing the same to melt the scrap in the vessel B by the heat of arc; (FIG. 3iv); and (v) After completion of the melting of the scrap in the vessel B, discharging the molten iron while continueing heating of the scrap in the vessel B; (FIG. 3v).

Then, the steps ii to v are repeated with the vessels A and B substituting for each other. Namely, the following further steps are taken.

(vi) Loading of the vessel B with scrap and heating of this scrap, while melting the scrap in the vessel A; (FIG. 3vii)

(vii) Discharging the molten metal from the vessel A and continueing heating of scrap in the vessel B; (FIG. 3vii)

(viii) Loading of the vessel A with scrap and heating of this scrap while melting the scrap in the vessel B; FIG. 3viii); and (ix) Discharging the molten iron from the vessel B and continueing heating of scrap in the vessel A. (FIG. 3ix)

The waste gas after the heating of the scrap, still considerably hot, is preferably used for preheating of the scrap in a separately prepared preheating vessel, also in this case. The exhaust gas generated as a result of the arc melting should be utilized too.

If necessary, it is possible to use an auxiliary burner for heating the scrap, as in the case of the preceding embodiment.

The method of this embodiment can be carried out by an apparatus which has, in addition to the vessels used in the preceding embodiment and constituting the bodies of arc furnaces, a separate gasification furnace as shown in FIG. 3.

More specifically, the gasification furnace 1 has a shell 11 made of steel and lined with a refractory material 12, the shell 11 being provided at its lower side with at least one carbonaceous material injecting nozzle 13 and at least one oxygen-containing gas blowing nozzle 14 and at its upper side with an exhaust gas outlet 15. A reference numeral 16 designates a nozzle for discharging the molten iron. In order to selectively introduce the hot exhaust gas from the gasification furnace 1 to the vessels 2A and 2B, the exhaust gas passage 5 is adapted to be switched to the vessel which is being covered by the lid and being under the melting operation.

A reference numeral 51 shows a gas manifold in which oxygen-containing gas is blown into the waste gas consisting mainly of CO thereby to burn the CO into $CO_2$. The means for effecting this blowing of oxygen-containing gas may be disposed in the space above the gasification furnace, or the blowing may be made into the exhaust gas passage or the vessel which is under the melting of the scrap, as explained before in connection with the basic embodiment of the invention.

An appreciable temperature rise takes place in the gasification furnace due to the combined introduction of the carbonaceous material and the oxygen-containing gas. In some cases, therefore, it is necessary to control the temperature in the gasification furnace through carrying the heat away from the latter. To this end, it is advisable to put into the gasification furnace a suitable amount of cold matters such as cold scrap, iron ore and the like. The use of the iron ore produces an additional effect of reduction of the one to iron by CO. The amount of molten iron in the furnace is increased as a result of the melting of the cold matter. Therefore, when a predetermined level of molten metal is reached in the gasification furnace, the surplus molten iron is preferably merged in the iron molten by the heat of arc and sent to a steelmaking process or delivered to a vessel containing the scrap which is going to be molten.

Besides all of the advantages brought about by the basic embodiment described before, the following advantage is offered by this embodiment. Namely, since the gasification is conducted separately from the melting of scrap by arc, it is possible to attain a higher thermal efficiency, as well as an easier and stabler operation of the apparatus, through elimination of interference between the gasification and the melting.

The scrap melting apparatus of the invention does not require substantial investment or cost, because vessels and other major parts such as the scrap transportation means of the existing arc furnace equipment can be used as they are or, if necessary, with suitable lining with a refractory material, although additional provision of the gasification furnace and the gas passage is necessary.

As explained before, in the scrap melting method of the invention, regardless of whether the basic or the modified embodiment, it is preferred to utilize the waste gas after the heating of the scrap in the vessel A or B, as well as the exhaust gas produced as a result of the arc melting, in the preheating of the scrap for the additional charge. It is, therefore, advisable to prepare a means for effecting such preheating. The preheating means comprises essentialy a preheating vessel 7 as shown in FIG. 4 and associated preheating gas passage 6.

Hereinunder, examples of the heat balance in the modified embodiment of the invention will be shown to prove the merits of the invention.

EXAMPLE 1

An apparatus having the construction as shown in FIGS. 2 to 4 was used. The vessel 2A and the preheating vessel 7 were loaded, respectively, with 54 tons and 36 tons of iron scrap. On the other hand, the gasification furnace was charged with iron which had been molten beforehand in another arc furnace. Then, a carbonaceous material was injected into the gasification furnace at a rate of 3393 Kg as calculated on C-basis per one charge, together with oxygen which was blown at a rate of $3155N^3$ by $O_2$-basis per one charge.

The amount of heat generated by the oxidation of C into $CO_2$ is calculated as follows:

$$3393 \text{ Kg} \times 7840 \text{ Kcal/Kg} = 26.6 \times 10^6 \text{ Kcal}$$

About 7.9% of this heat is fed to the molten iron, 11.7% is wasted and 79.1% is utilized as the sensible heat of the exhaust gas in the heating of the scrap. The overall thermal efficiency of the heating and preheating of the scrap was 58%. That is, the following amount of heat was delivered to the scrap in advance to the melting by arc.

$$26.6 \times 10^6 \times 0.791 \times 0.58 = 12.2 \times 10^6 \text{ (Kcal)}$$

The heat-content of the molten steel of 1600° C. amounts to 331 Kcal/Kg. It is experimentally known that this value of heat amount substantially equals to the electric power consumed in the conventional method which employs only the arc furnace. Therefore, the amount of heat consumed under saving of energy by the heating and preheating in accordance with the invention is expressed as follows:

$$331 \text{ (Kcal/Kg)} \times 90 \text{ (tons)} - 12.2 \times 10^6$$
$$\text{(Kcal)} = 29.8 \times 10^6 - 12.2 \times 10^6 = 17.7 \times 10^6 \text{ (Kcal)}$$

This heat amount is equivalent to electric energy of 2046 KWH. This in turn is calculated as follows.

$$2046 \text{ KWH} \div 90 \text{ tons} = 227 \text{ KWH/charge ton}$$

Thus, the electric power consumption per charge ton is decreased to 227 KWH.

The advantage of the invention will be more clearly realized from the following table in which the principal items of the method of the invention are compared with those of the prior art.

|  | prior art | invention |
|---|---|---|
| one operation cycle (minutes) | 90 | 45 |
| amounts per charge ton C (Kg/cht) | 22.8 | 37.7 |
| $O_2$ ($Nm^3$/cht) | 27.6 | 35.0 |
| electric power (KWH/cht) | 400 | 227 |

EXAMPLE 2

The operation was made substantially under the same condition as Example 1 except that an auxiliary heating was effected to heat the scrap by a fine powdercoal-oxygen burner. As a result of the auxiliary heating, the amount of heat delivered to the scrap in advance to the arc melting was increased to $12.6 \times 10^6$ Kcal, with the following data of major items.

| C | (Kg/cht) | 35.0 |
|---|---|---|
| $O_2$ | ($Nm^3$/cht) | 46.7 |
| electric power | (KWH/cht) | 222 |

We claim:
1. A method of melting iron scrap comprising the steps of:
(I) loading each one of a pair of arc furnaces with batches of iron scrap and inserting a set of electrodes into the first of the pair of furnaces and commencing the melting of the batch of scrap in the first furnace;
(II) blowing an oxygen-containing gas and injecting a carbonaceous material into said first furnace in which the batch of scrap is being melted thereby to oxidize the carbonaceous material mainly to CO and delivering the hot exhaust gas containing CO to the second of the pair of furnaces while supplying said oxygen-containing hot gas thereto so as to oxidize the CO into $CO_2$ thereby to heat the batch of scrap in said second furnace by the sensible heat possessed by the hot exhaust gas and the heat generated through the oxidation;
(III) discharging the molten iron from said first furnace after completion of the melting while shifting the set of electrodes to said second furnace to commence the melting of the batch of scrap in said second furnace by the heat of arc;
(IV) loading said first furnace with a new batch of scrap while blowing an oxygen-containing gas and injecting carbonaceous material into said second furnace, and delivering the exhaust gas from said second furnace into said first furnace while introducing an oxygen-containing gas thereby to heat the new batch of scrap in said first furnace;
(V) discharging the molten iron from said second furnace after completion of the melting while shifting the set of electrodes to said first furnace to commence the melting of the new batch of scrap in said first furnace; and (VI) repeating the above steps II to V.

2. A method of melting iron scrap according to claims 1, wherein the exhaust gas after the heating of the batch of scrap is introduced into a separate preheating chamber as as to preheat the scrap received therein for additional charge, and the preheated batch of scrap is additionally charged into the vessel in which the batch of scrap is being melted by the heat of arc.

3. An apparatus for melting iron scrap basically comprising: a first vessel and a second vessel which are the arc furnace bodies each having at least one carbonaceous material injecting nozzle and at least one oxygen-containing gas blowing nozzle, a single lid and a set of arc-generating electrodes which are used alternatingly in combination with the first and the second vessels; an exhaust gas passage through which the waste gas is introduced from one to the other vessels and vice versa; and means for introducing an oxygen-containing gas into this waste gas.

4. A method of melting iron scrap comprising the steps of:

(i) loading each of a pair of arc furnaces with batches of iron scrap, while loading a gasification furnace with molten iron and blowing an oxygen-containing gas and injecting a carbonaceous material into the molten iron thereby to oxidize the carbonaceous material mainly to CO, delivering the hot exhaust gas thus formed to the first of the pair of furnaces, while blowing oxygen-containing gas to said first furnace so as to oxidize the CO into $CO_2$ thereby to heat the batch of scrap in the first furnace by the sensible heat possessed by said hot waste gas and the heat generated through the oxidation;

(ii) switching the delivery of the gas from the gasification furnace and the blowing of the oxygen-containing gas from the first furnace to the second furnace of the pair of furnaces so as to heat the batch of scrap in the second furnace, while inserting a set of electrodes into the first furnace and energizing the same thereby to melt the batch of scrap in the first furnace;

(iii) after completion of melting the batch of scrap in the first furnace, discharging the molten iron while continuing the heating of the batch of scrap in the second furnace;

(iv) loading the discharged first furnace again with a batch of scrap and switching again the delivery of the gas from the gasification furnace and the blowing of the oxygen-containing gas from the second furnace to the first furnace, while inserting the set of electrodes into the second furnace and energizing the same to melt the batch of scrap in the second furnace by the heat of arc;

(v) after completion of melting the batch of scrap in the second furnace, discharging the molten iron while continuing the heating of the batch of scrap in the first furnace; and (vi) repeating the steps ii to v with the first furnace and the second furnace substituting for each other.

5. A method of melting iron scrap according to claim 1 further comprising the steps of introducing the waste gas after heating the batch of scrap and the exhaust gas from the arc furnaces into a common preheating vessel so as to preheat a batch of scrap in the preheating vessel, and additionally charging the preheated batch of scrap into the furnace in which the batch of scrap is being melted by the heat of arc.

6. A method of melting iron scrap according to claim 4 further comprising the steps of adjusting the temperature in the gasification furnace by putting a cold material containing iron into said gasification furnace, and merging a resulting surplus molten iron in the molten iron in the arc furnace.

7. An apparatus for melting iron scrap comprising a gasification furnace lined with a refractory material and provided at its lower portion with at least one carbonaceous material injecting nozzle and at least one oxygen-containing gas blowing nozzle; the first and the second vessels constituting the bodies of arc furnaces; a lid and a set of arc generating electrodes adapted to be used alternatingly for the first and the second vessels; and an exhaust gas passage for introducing the exhaust gas from said gasification furnace together with the oxygen-containing gas selectively into the first and the second vessels.

8. An apparatus for melting iron scrap according to claim 7 further comprising the third vessel for preheating iron scrap, and means for introducing the waste gas from the first and the second vessels into the third vessel thereby to preheat the iron scrap in the third vessel.

* * * * *